US012237606B2

(12) United States Patent
Hsu

(10) Patent No.: US 12,237,606 B2
(45) Date of Patent: Feb. 25, 2025

(54) ELECTRICAL CONNECTOR HAVING A CONTACT AND A STANDOFF SECURED TO THE CONTACT

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Shuo-Hsiu Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 341 days.

(21) Appl. No.: 17/826,609

(22) Filed: May 27, 2022

(65) Prior Publication Data

US 2022/0384976 A1 Dec. 1, 2022

(30) Foreign Application Priority Data

May 31, 2021 (CN) ........................ 202110598003.X

(51) Int. Cl.

*H01R 13/24* (2006.01)
*H01R 13/405* (2006.01)
*H01R 13/516* (2006.01)

(52) U.S. Cl.

CPC ....... *H01R 13/2464* (2013.01); *H01R 13/405* (2013.01); *H01R 13/516* (2013.01)

(58) Field of Classification Search

CPC . H01R 13/2464; H01R 13/405; H01R 13/516
USPC .................................................... 439/626, 83
See application file for complete search history.

(56) References Cited

U.S. PATENT DOCUMENTS 6,695,628 B2 * 2/2004 Yeh .................... H01R 13/2442 439/83
6,866,520 B2 * 3/2005 Chiang .............. H01R 13/2435 439/862
7,048,549 B1 * 5/2006 Swain .................. H01R 12/714 439/591
7,628,661 B2 * 12/2009 Liao ....................... H01R 12/57 439/862
7,682,165 B2 * 3/2010 Liao ..................... H05K 3/3426 439/83
7,695,288 B2 * 4/2010 Ma ......................... H01R 43/20 439/70
7,753,695 B2 * 7/2010 Howell .................. H01R 13/33 439/82
7,857,632 B2 * 12/2010 Liu .................... H01R 13/2492 439/66
7,972,144 B2 * 7/2011 Chang .................. H01R 12/714 439/83
8,096,836 B2 * 1/2012 Cheng ................ H01R 13/2435 439/626

(Continued)

*Primary Examiner* — Peter G Leigh
(74) *Attorney, Agent, or Firm* — Ming Chieh Chang

(57) ABSTRACT

An electrical connector includes: an insulative base having a top surface, a bottom surface, and plural holes extending through the top surface and the bottom surface; a group of contacts mounted to corresponding holes, each contact having an upper contacting arm and a side portion; and a standoff secured to the side portion.

10 Claims, 9 Drawing Sheets

(56) References Cited

U.S. PATENT DOCUMENTS

| | | | | |
|---|---|---|---|---|
| 8,419,446 | B2 * | 4/2013 | Fan | H01R 12/52<br>439/83 |
| 8,888,525 | B2 * | 11/2014 | Yeh | H05K 7/10<br>439/539 |
| 8,899,997 | B2 * | 12/2014 | Zhang | H01R 12/57<br>439/83 |
| 9,088,084 | B2 * | 7/2015 | Liao | H01R 13/41 |
| 9,178,328 | B2 * | 11/2015 | Heppner | H01R 43/24 |
| 10,547,136 | B2 * | 1/2020 | Ho | H01R 13/2464 |
| 11,108,183 | B2 | 8/2021 | Liao | |
| 2008/0227324 | A1 * | 9/2008 | Cheng | H01R 13/11<br>439/342 |
| 2012/0045946 | A1 * | 2/2012 | Liao | H01R 12/57<br>439/700 |
| 2019/0334272 | A1 * | 10/2019 | Hsu | H01R 12/714 |
| 2021/0021067 | A1 | 1/2021 | Hsu | |
| 2021/0104831 | A1 | 4/2021 | Cheng et al. | |
| 2021/0203098 | A1 | 7/2021 | Hsu | |

* cited by examiner

ELECTRICAL CONNECTOR HAVING A CONTACT AND A STANDOFF SECURED TO THE CONTACT

BACKGROUND OF THE INVENTION

1. Field of the Invention

The present invention relates generally to a CPU (central processing unit) socket and more particularly to an electrical connector comprising: an insulative base having a top surface, a bottom surface, and a plurality of holes extending through the top surface and the bottom surface; a group of contacts mounted to corresponding holes; and a standoff mechanism for regulating a movement of the contacts.

2. Description of Related Arts

U.S. Patent Application Publication No. 2021/0104831 discloses an electrical connector comprising: an insulative base having a plurality of holes extending therethrough; a group of contacts mounted to corresponding holes; and a plurality of standoffs formed on a surface of the insulative base. With increasing CPU socket form factor, the number of contacts and/or the volume of the insulative base would be increased. However, with an increase in the number of contacts and therefore a decrease in the volume ratio of the standoff to the insulative base, the standoffs may not be adequately formed, e.g., short shot, during molding process.

SUMMARY OF THE INVENTION

An electrical connector comprises: an insulative base having a top surface, a bottom surface, and a plurality of holes extending through the top surface and the bottom surface; a group of contacts mounted to corresponding holes, each contact having an upper contacting arm and a side portion; and a standoff secured to the side portion.

DETAILED DESCRIPTION OF THE PREFERRED EMBODIMENT

Figure 1:
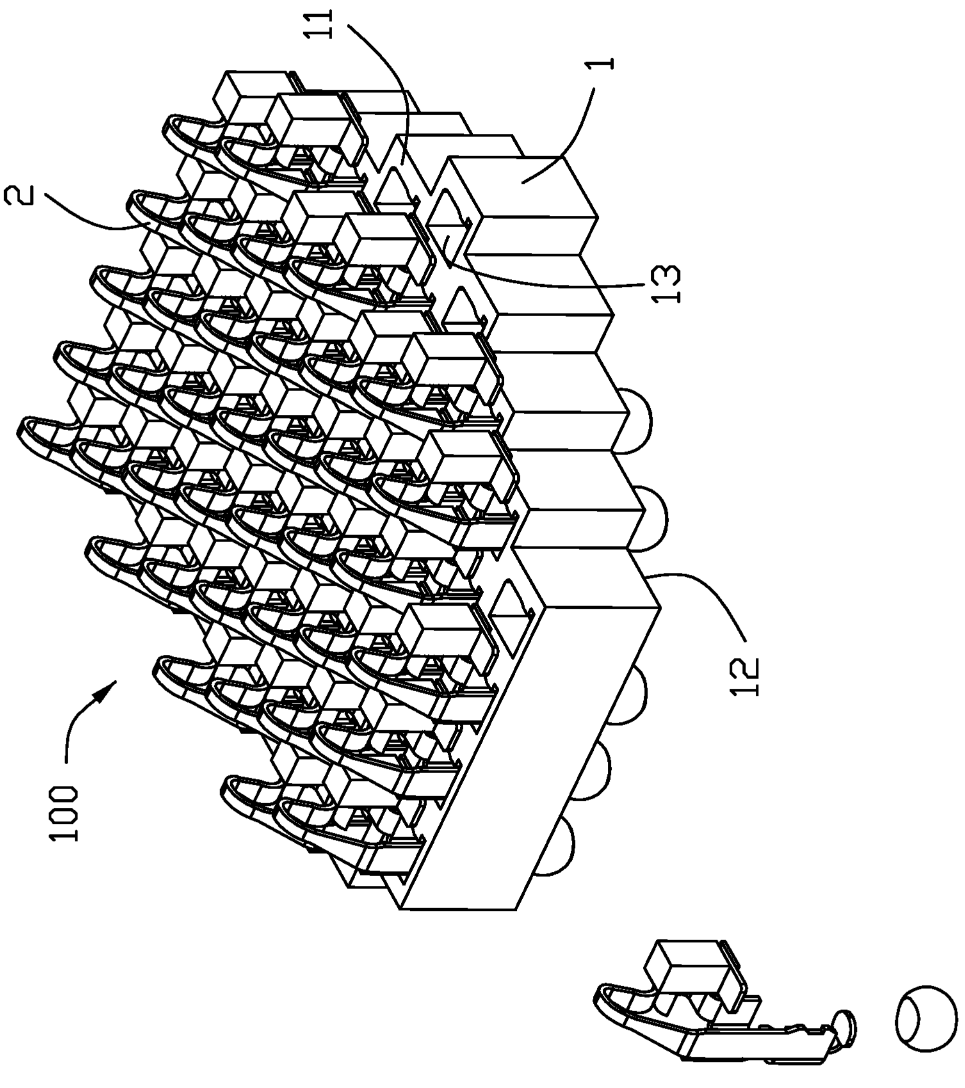
FIG. 1 is a perspective view of an electrical connector in accordance with the present invention.
Figure 2:
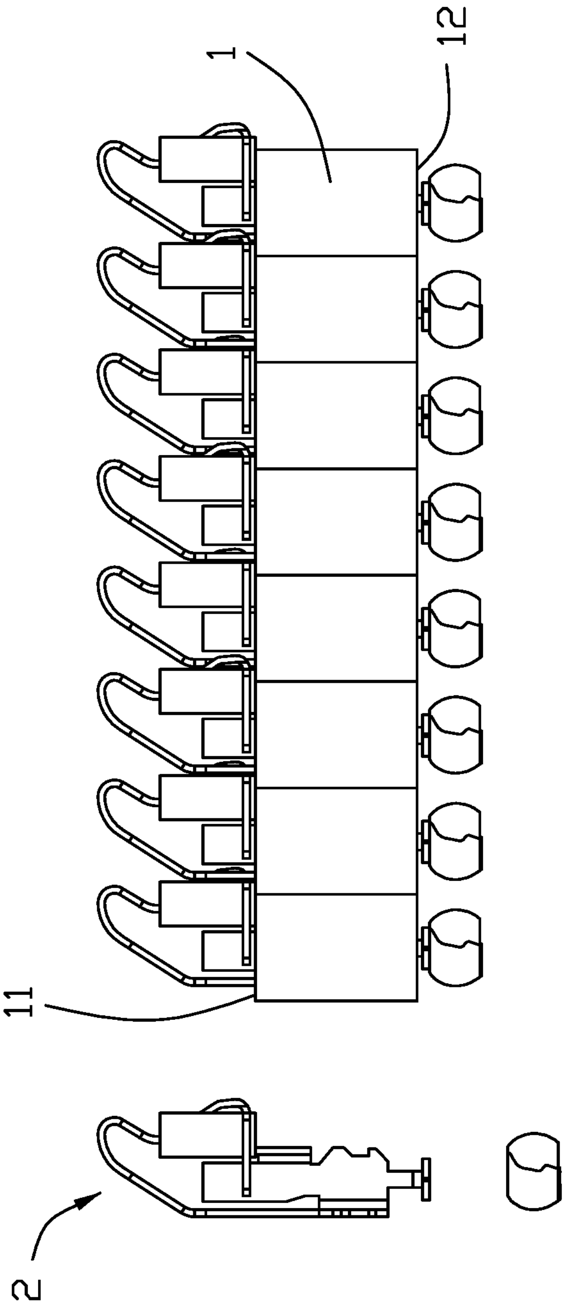
FIG. 2 is a side view of the electrical connector.
Figure 3:
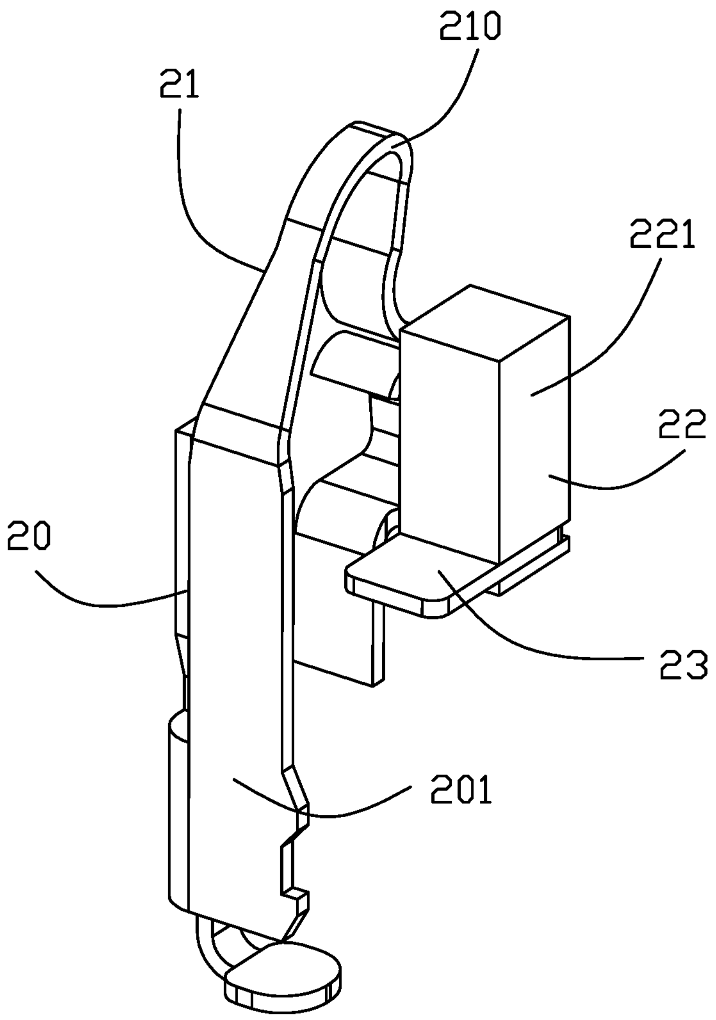
FIG. 3 is a perspective view of a contact of the electrical connector.
Figure 4:
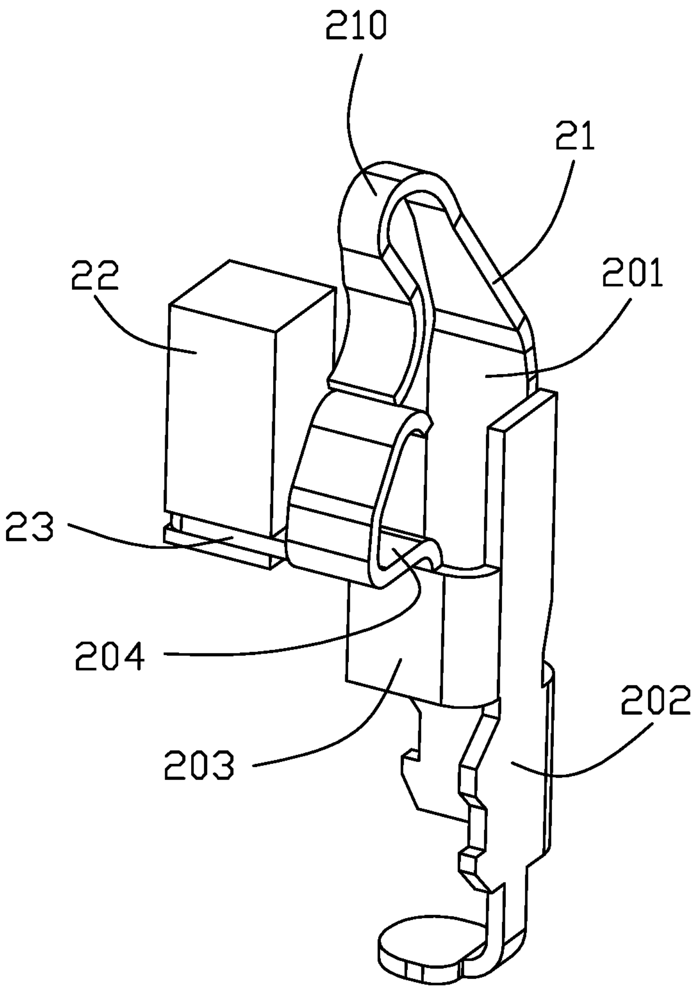
FIG. 4 is another perspective view of the contact.
Figure 5:
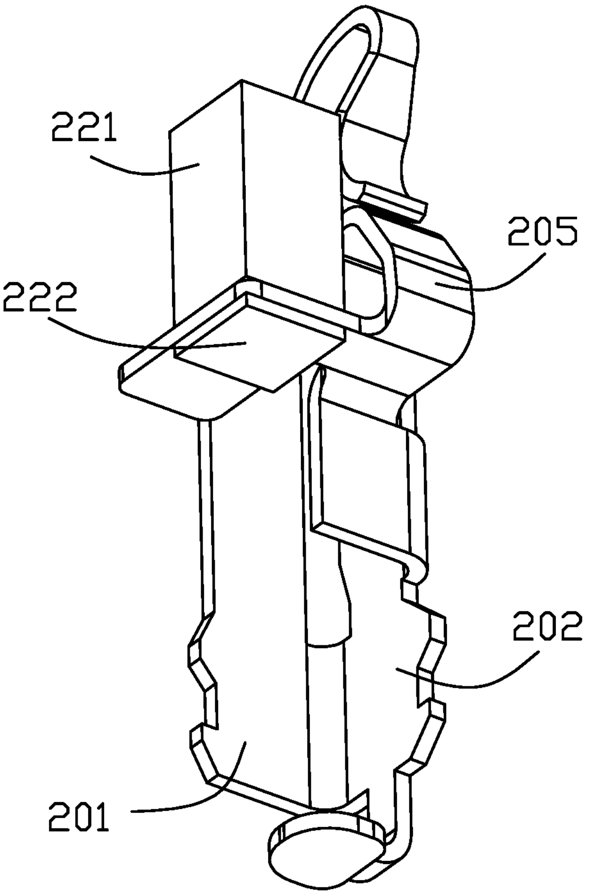
FIG. 5 is a still another perspective view of the contact.
Figure 6:
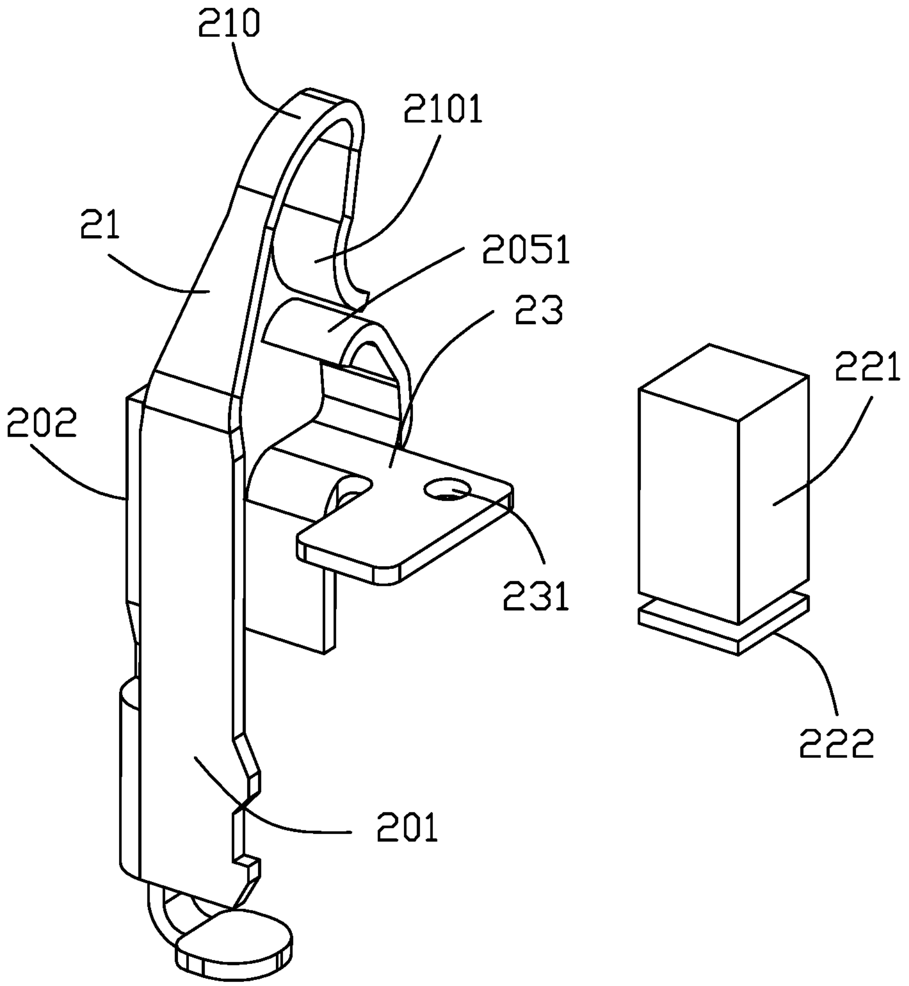
FIG. 6 is an exploded view of the contact.
Figure 7:
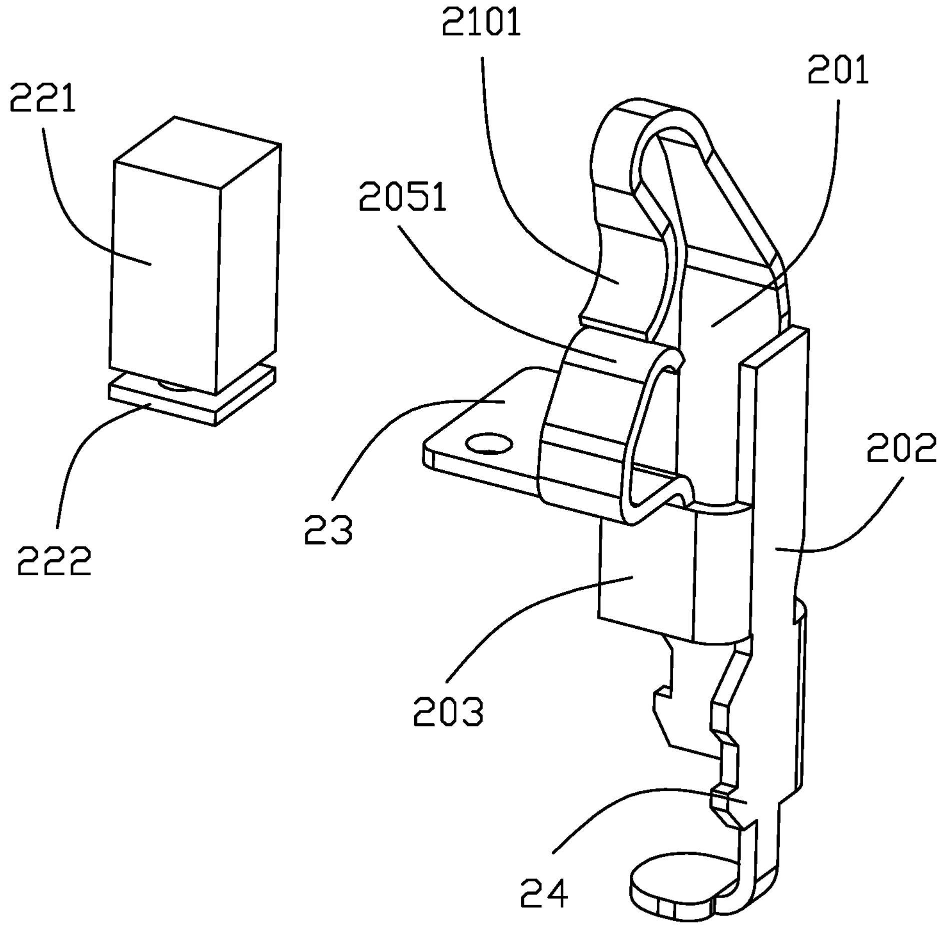
FIG. 7 is another exploded view of the contact.
Figure 8:
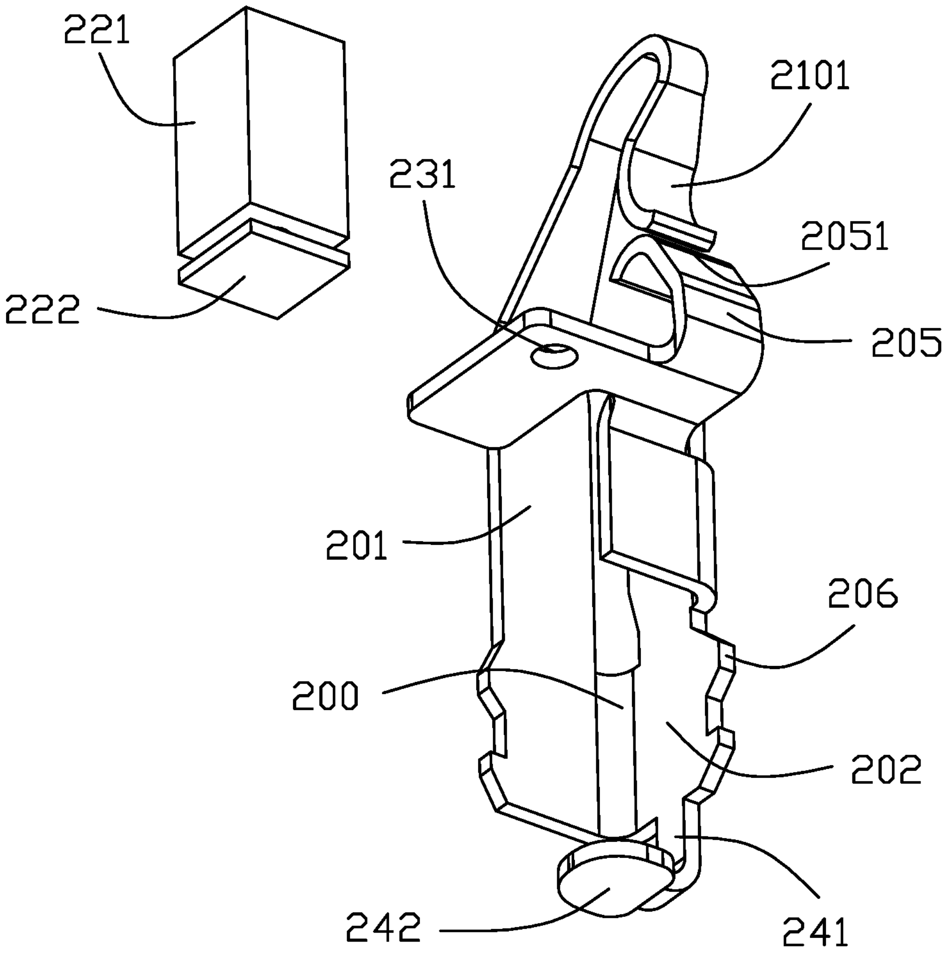
FIG. 8 is a still another exploded view of the contact.
Figure 9:
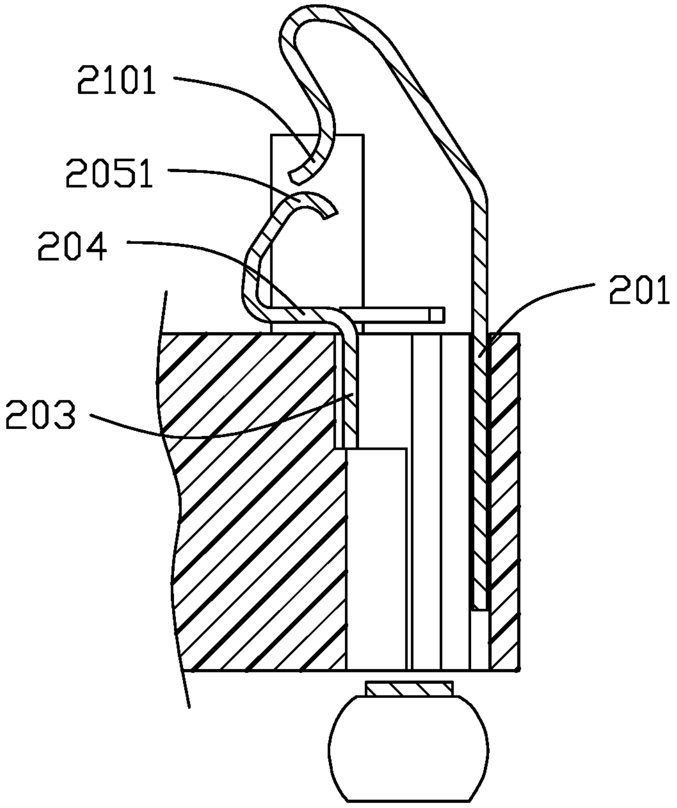
FIG. 9 is a cross-sectional view of the electrical connector.

Referring to FIGS. 1 to 9, an electrical connector 100 for electrically connecting a CPU to a printed circuit board (PCB) comprises: an insulative base 1 having a top surface 11, a bottom surface 12, and a plurality of holes 13 extending through the top surface 11 and the bottom surface 12; a group of contacts 2 mounted to corresponding holes 13, each contact 2 having an upper contacting arm 21 and a side portion 23; and a standoff 22 secured to the side portion 23. The upper contacting arm 21 has a contacting portion 210. The side portion 23 is substantially horizontal and has a hole

231. The standoff 22 is insulative and preferably insert-molded with the side portion 23 to form an upper platform 221 and a lower base 222.

The contact 2 includes a securing part 20 having a first securing portion 201 connected to the upper contacting arm 21 and a second securing portion 202 oriented substantially perpendicular to the first securing portion 201 through a connecting bridge 200 thereof. Each of the first and second securing portions 201 and 202 has one or more barbs 206. The contact 2 further includes a first connecting portion 203 oriented substantially perpendicular to the second securing portion 202 and a second connecting portion 204 oriented substantially perpendicular to the first connecting portion 203; the side portion 23 is connected to the second connecting portion 204. The first and second connecting portions 203 and 204 are located higher than the barbs 206.

The contact 2 may further have an abutting arm 205 extending upwardly from the second connecting portion 204 for engaging the upper contacting arm 21 during its downward movement to create dual current flow paths. The contacting portion 210 of the upper contacting arm 21 has an engaging portion 2101 and the abutting arm 205 correspondingly has an abutting portion 2051. Both the engaging portion 2101 and the abutting portion 2051 are convex toward each other. The contact 2 further includes a mounting leg 24 preferably downward extending from the second securing portion 202. The mounting leg 24 has a connecting portion 241 and a horizontal plate 242.

What is claimed is:

1. An electrical connector comprising:

an insulative base having a top surface, a bottom surface, and a plurality of holes extending through the top surface and the bottom surface;

a group of contacts mounted to corresponding holes, each contact having an upper contacting arm and a side portion; and a standoff secured to the side portion, the standoff being insulative and resting on the top surface of the insulative base.

2. The electrical connector as claimed in claim 1, wherein the contact has a first securing portion connected to the upper contacting arm and a second securing portion oriented substantially perpendicular to the first securing portion.

3. The electrical connector as claimed in claim 2, wherein the contact has a first connecting portion oriented substantially perpendicular to the second securing portion and a second connecting portion oriented substantially perpendicular to the first connecting portion, and the side portion is connected to the second connecting portion.

4. The electrical connector as claimed in claim 1, wherein the standoff is insert-molded with the side portion.

5. The electrical connector as claimed in claim 1, wherein the side portion is substantially horizontal.

6. The electrical connector as claimed in claim 1, wherein the contact has an abutting arm extending upwardly from the second connecting portion.

7. An electrical connector comprising:

an insulative base having a top surface, a bottom surface, and a plurality of holes extending through the top surface and the bottom surface;

a group of contacts mounted to corresponding holes, each contact having an upper contacting arm and a side portion; and a standoff secured to the side portion; wherein the contact has a first securing portion connected to the upper contacting arm and a second securing portion connected to the first securing portion;

the contact has a first connecting portion oriented substantially perpendicular to the second securing portion and a second connecting portion oriented substantially perpendicular to the first connecting portion, and the side portion is connected to the second connecting portion; and the contact has an abutting arm extending upwardly from the second connecting portion.

8. The electrical connector as claimed in claim 7, wherein the second securing portion is oriented substantially perpendicular to the first securing portion.

9. The electrical connector as claimed in claim 7, wherein the standoff is insert-molded with the side portion.

10. The electrical connector as claimed in claim 7, wherein the side portion is substantially horizontal.

* * * * *